June 30, 1953

T. C. BAKER 2,643,767

APPARATUS FOR DETECTING CHECKS IN THE RIM
OR FINISH PORTIONS OF GLASS CONTAINERS

Filed Aug. 24, 1945

Inventor
Theodore C. Baker
by Lloyd B. Bates
Attorney

Fig. 2.

June 30, 1953  T. C. BAKER  2,643,767
APPARATUS FOR DETECTING CHECKS IN THE RIM
OR FINISH PORTIONS OF GLASS CONTAINERS
Filed Aug. 24, 1945  5 Sheets-Sheet 3

Inventor
Theodore C. Baker
by Lloyd G. Bates
Attorney

June 30, 1953

T. C. BAKER 2,643,767

APPARATUS FOR DETECTING CHECKS IN THE RIM
OR FINISH PORTIONS OF GLASS CONTAINERS

Filed Aug. 24, 1945

Patented June 30, 1953

2,643,767

UNITED STATES PATENT OFFICE 2,643,767

APPARATUS FOR DETECTING CHECKS IN THE RIM OR FINISH PORTIONS OF GLASS CONTAINERS

Theodore C. Baker, Perrysburg, Ohio, assignor to Emhart Manufacturing Company, a corporation of Delaware Application August 24, 1945, Serial No. 612,484

11 Claims. (Cl. 209—111)

The invention relates to improvements in devices for inspecting articles to ascertain the presence or absence of particular defects therein and for separating from the other inspected articles those which are thus ascertained to be defective.

An object of the invention is to provide an efficient, automatically operating apparatus for detecting checks in the rim or finish portions of glass jars or the like and for separating out from the other inspected articles all those containing such checks.

Another object of the invention is to provide an apparatus of the character described which is adapted to receive and thereafter to inspect for rim or finish checks each of a continuous line or series of glass jars or the like in its turn, to reject and remove from the line or series each inspected article in which a rim or finish check has been detected, and to deliver the other inspected articles of the line or series in turn to a suitable article conducting or transporting device, whereby the apparatus is well adapted for cooperative association with other article conveying and handling devices, such, for example, as those which are required or may be used in a commercial glass container packing plant.

A further object of the invention is to utilize the light reflecting characteristics of a check in the rim or finish portion of a glass jar or like article to energize a photoelectric cell unit of the apparatus whenever such a check has been brought into the focus at an inspection station of a beam of light from a suitably positioned light source and to provide a reliable and efficient mechanism controlled by the photoelectric cell unit and rendered effective by energization thereof to reject each article containing such a check after that article has been moved from the inspection station to a predetermined rejection station.

A further object of the invention is the provision of an apparatus of the character described having an intermittently rotated carrier for receiving in turn at a receiving station jars or like articles to be inspected, for moving such articles in turn to an inspection station where each article is rotated about its own vertical axis to rotate the rim or finish of the article in a beam of light that passes therethrough to a focal point in the portion of the rim or finish remote from the source of light, for thereafter moving the articles in turn to a rejection station at which each article having a check in its rim or finish portion as shown by reflection of light from the check into a suitably positioned photoelectric cell unit is ejected from the carrier by article rejecting mechanism actuated by reason of energization of the photoelectric cell unit by the light reflected from the check, and for thereafter moving in turn to a delivery station the articles in which no checks have been thus detected, together with means for removing from the carrier each article arriving at the delivery station and control means for preventing haphazard, untimely or unintended operation of the article rejecting mechanism, even though light adequate to energize the photoelectric cell unit may reach the latter otherwise than by reflection from a check in the rim or finish of an article at the inspection station.

Other objects of the invention reside in the provision of novel and useful structural and operating features of an apparatus of the character described. These and important advantages of the invention will hereinafter be more particularly pointed out or will become apparent from the following description of a practical embodiment of the invention, as shown in the accompanying drawings, in which:

Figure 1:
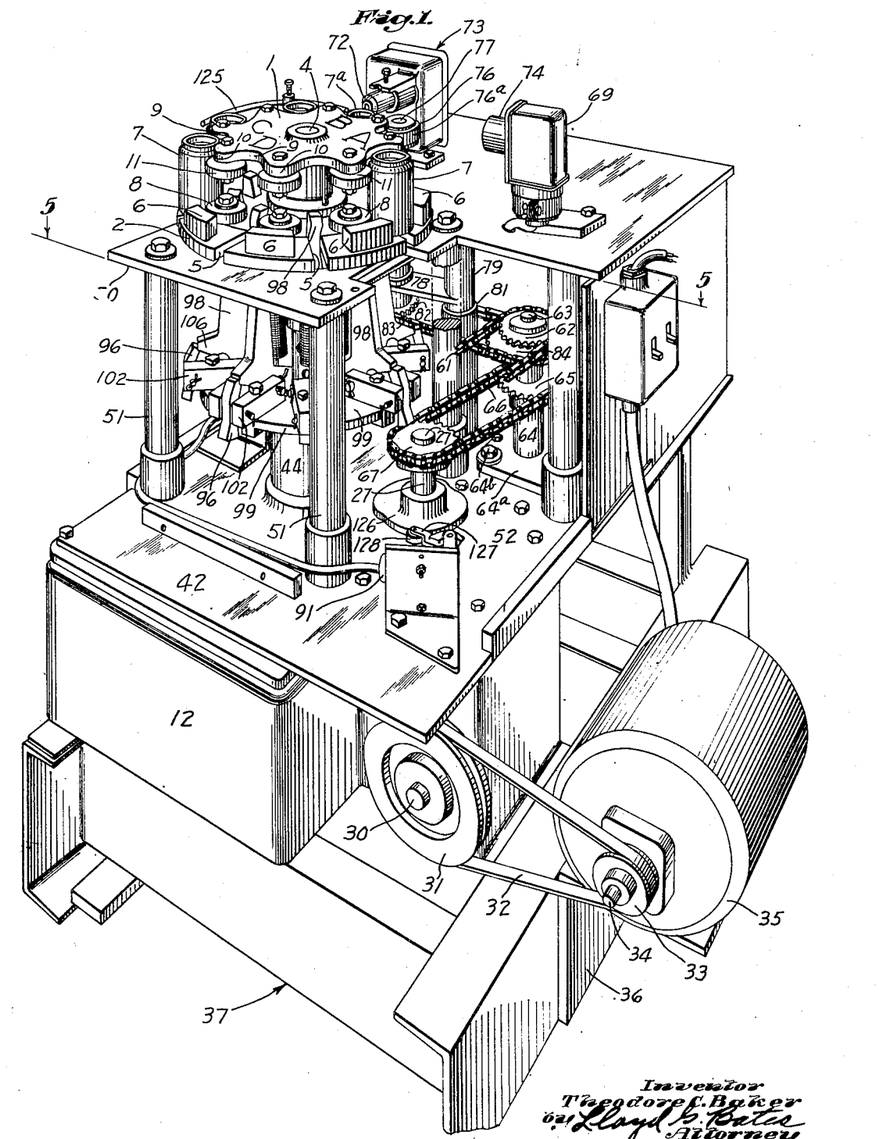
Figure 1 is a perspective view of a major part of an illustrative apparatus of the invention, certain elements of the complete apparatus being omitted and other elements being in part broken away to afford a better view of the parts shown.
Figure 2:
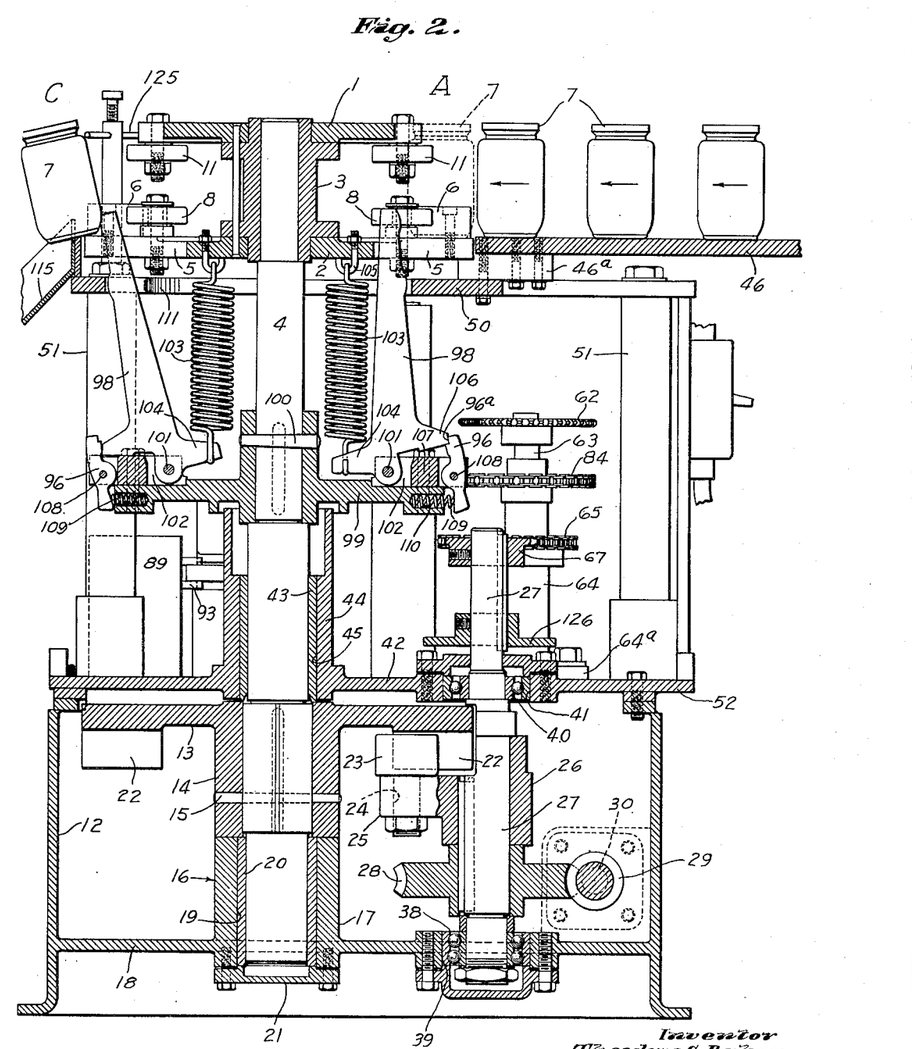
Fig. 2 is a relatively enlarged vertical section through a portion of the apparatus, showing the rotary carrier for the articles to be inspected, the means for intermittently rotating the carrier and for operating certain associate parts, and parts of the aricle loading and article rejecting mechanisms.
Figure 3:
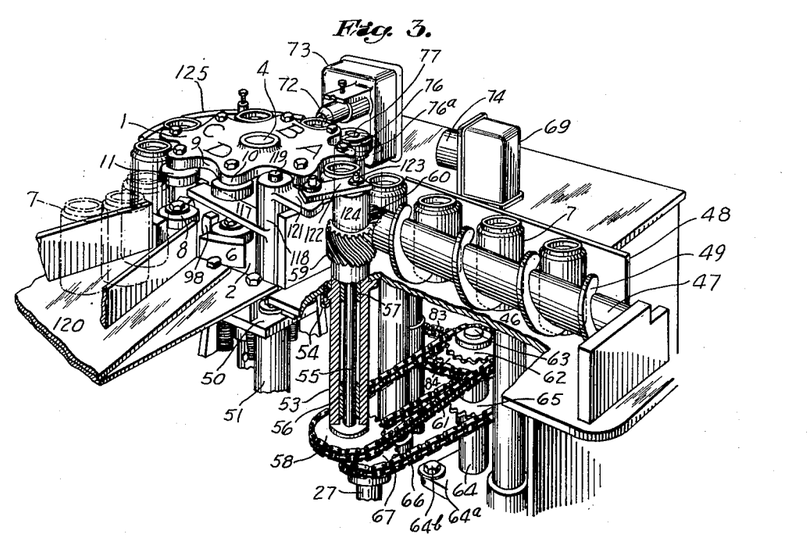
Fig. 3 is a perspective view of the upper portion of the apparatus, showing the rotary carrier, the cooperative light source and photoelectric cell unit, the mechanism for loading articles onto the carrier at one station and mechanism for unloading and conductiing articles away from the carrier at another station.

The illustrative apparatus of the drawings comprises a rotary carrier which comprises vertically spaced upper and lower centrally apertured plates 1 and 2, respectively, Figs. 1, 2 and 3, on a vertically disposed hub 3 which is mounted on the upper end portion of a vertical driven shaft 4 to rotate with the latter, as best seen in Fig. 2. The means for supporting the shaft 4 for rotation about its axis and for rotating it intermittently or step-by-step will later be described.

Figure 4:
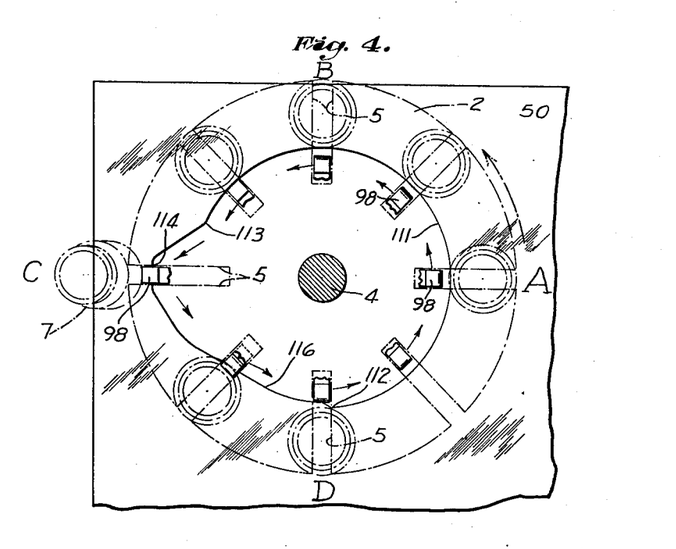
Fig. 4 is a diagrammatic plan view, showing a closed or endless cam surface and different relative positions of article ejecting elements controlled thereby at different angularly spaced points around the axis of rotation of the article carrier.

The lower plate, 2, of the carrier may be generally circular in configuration and may be provided with a plurality of regularly spaced radial rather wide slits 5 which, as shown in Fig. 2 and the diagrammatic view, Fig. 4, extend from the outer edge of such plate for the greater part of its radial extent. As indicated by Fig. 4, these slits are eight in number in the example shown. Blocks 6 corresponding in number with the spaces between the slits 5 are fixed on the plate 2 adjacent to the outer edge thereof and in regularly spaced relative positions, so that each two adjacent blocks respectively are located at opposite sides of a slit and equi-distant therefrom, the space between such adjacent blocks being greater but only sufficiently greater than the diameter of the lower portion of each of the articles, as for example, jars 7, to permit such article to be slid radially inward on a slitted portion of the plate 2 with the lower portion of the article passing between adjacent blocks which serve as side guides therefor. Article positioning rollers 8, corresponding in number with the blocks, are mounted on the plate 2 in regularly spaced positions which are radially inward from the respective blocks. The rollers 8 are turnable freely about their respective vertical axes and the straight line distance between the adjacent portions of the peripheries of each two adjacent rollers is less than the diameter of the lower portion of each jar 7 so that such adjacent rollers will contact with and together limit the radial inward movement on the plate 2 of a jar that has been slid on such plate radially inward between two of the blocks 6.

The upper plate 1 of the rotary article carrier is of less diametrical extent than the lower plate 2 and may be formed with a regularly scalloped peripheral edge, i. e., it has alternating convexly curved re-entrant and convexly curved relatively projecting peripheral edge portions, as indicated at 9 and 10, respectively, Figs. 1 and 3. The projecting portions 10 of the plate 1 are located above the rollers 8 on the plate 2 and carry depending freely turnable article contacting rollers 11 which respectively are located above and in axial alignment with the rollers 8. Each two adjacent rollers 11 are spaced apart a distance less than the diameter of the upper portion of the body of the jar 7 with which such rollers may contact, so as to cooperate with each other and with the aligned lower rollers 8 to limit radial inward movement of the jar on the plate 2 and to position such jar suitably on the carrier. In other words, each set of two upper and two lower rollers together with the adjacent blocks 6 and the adjacent portions of the upper and lower plates of the carrier form a sort of an open-outer-sided pocket on the carrier for one of the jars 7. Each such jar may be moved bodily in a generally radial direction across the edge of the article supporting plate 2 of the carrier into or out of the aforesaid pocket. The rollers of each such pocket may have the additional function of aiding suitable means, hereinafter to be described, to effect rotation about its own axis of the jar in the pocket when that jar has been brought by the carrier to a station at which its rim or finish portion is to be inspected for checks.

As best seen in Fig. 2, the lower portion of the vertical carrier supporting and rotating shaft 4 is positioned within a gear box 12 and is there provided with a driven wheel 13 of a Geneva drive mechanism. The wheel 13 has a hub 14 pinned at 15 to the shaft 4 and having a bearing upon the upper end of an upright hollow bearing structure 16. As shown, this bearing structure comprises a tubular boss 17 rising from the bottom 18 of the gear box and having its bore formed to constitute a continuation of a vertical opening 19 in the bottom of the gear box. A tubular liner 20 fits within the tubular boss 17 and is retained in place by bottom cap 21, the upper end of the liner 20 and the tubular boss 17 being flush with each other in the example shown. Any other suitable bearing structure for the lower end portion of the shaft 4 may be provided.

The wheel 13 is provided with angularly spaced depending straight-sided radial lugs 22. Each of these may be contacted by a roller 23 on the upper end of a short shaft or stud 24 carried by a projecting arm 25 on a hub 26 which is keyed to a vertical shaft 27. The arrangement is such that the wheel 13 and the shaft 4, which it drives, are turned about the axis of the latter one step during each rotation of the shaft 27, the roller 23 on the Geneva drive hub 26 contacting with the side of one of the lugs 22 to effect this result and then disengaging the lug to allow the wheel 13 and the parts driven thereby to remain at rest until further rotation of the shaft 27 brings the roller 23 into contact with the next succeeding lug 22. The lugs 22 correspond in number with the aforesaid so-called article receiving pockets on the carrier, so that each of such pockets is brought in its turn to each of a plurality of stations or places of dwell. These correspond in number with the pockets on the carrier and are regularly spaced around the periphery of the carrier. Some of these stations, hereafter more particular identified, are utilized for particular purposes in the operation of the apparatus, while the remaining stations may be simply idle stations.

The shaft 27 may be turned continuously about its axis at a constant speed by a suitable driving mechanism which may comprise a worm wheel 28 which is keyed on the shaft 27 and is driven by a worm 29. The latter is mounted on a shaft 30 which protrudes through a suitable opening (not shown) in the side of a portion of the gear box to the exterior of the latter, Fig. 1, where it is provided with a pulley 31. The latter is driven by a belt 32 from a pulley 33 on the driven shaft 34 of a motor 35. The motor 35 may be carried by a bracket 36 on a framework structure, generally designated 37, on which the gear box 12 also may be supported. The shaft 27 may have its lower end portion rotatably supported in an anti-friction bearing assembly 38, Fig. 2, which is mounted in a suitable opening 39 in a portion of the bottom of the gear box. The shaft 27 may project upwardly through and be journaled in an upper anti-friction bearing assembly 40 which is mounted in a suitable opening 41 in a portion of the top 42 of the gear box. The upper end portion of the shaft 27 is utilized to drive other motion transmitting elements of the apparatus, as presently will be explained.

The intermittently driven shaft 4 extends through a bearing liner 43 which is located in an upstanding tubular boss 44 on a portion of the top 42 of the gear case, the tubular boss 44 having a bore constituting an upward continuation of an opening 45 in the top of the gear case.

One of the aforesaid stations to which each of the so-called pockets of the carrier is brought by the step-by-step rotation of the latter may be termed a loading station and is designed A in Figs. 1, 3 and 4. At this station, a suitable mechanism may be provided to load in its turn each of a single file procession of the jars 7 into a waiting pocket on the carrier. The loading mechanism of the apparatus shown comprises an article slideway 46 along which the articles are moved progressively and in spaced relation by a feed worm 47, the slideway having an edgewise disposed guide plate or rail 48, spaced from and parallel with the worm 47, for retaining the articles in contact with the spiral rib 49 of the feed worm. The slideway may be mounted on a horizontal plate 50, as by the attaching structure 46a, Fig. 2. The plate 50 may be supported on posts 51 which rise upwardly from a horizontal supporting plate 52, Figs. 1 and 2, a portion of which constitutes the hereinbefore mentioned top 42 of the gear box. A tubular thrust bearing 53 depends from the slideway 46, being fastened thereto as indicated at 54, Fig. 3. A vertical shaft 55 is journaled in bearing liners 56 and 57, respectively, in the tubular member 53 and is provided at its lower end with a sprocket 58 and at its upper end with a worm gear 59 having its teeth engaged with a driven worm 60 on an end portion of the article feed worm 47. The sprocket 58 is operatively connected by a chain 61 with a sprocket 62 on the upper end portion of a short vertical shaft 63, Figs. 1, 3 and 5. The shaft 63 rises from a vertical bearing socket 64 on an attaching plate 64a which may be fastened in place on a portion of the plate 52, as by fastening elements such as that shown at 64b, Fig. 1. The shaft 63 carries a sprocket 65, Figs. 1 and 3, operatively connected by a chain 66 with a sprocket 67 on the upper end portion of the hereinbefore described vertical shaft 27, Figs. 1, 3 and 5. By these driving connections, the article feeding operations of the feed worm 47 will be coordinated with the intermittent rotary movements of the carrier so that the carrier will present a pocket to the loading mechanism at the station A at the proper time for the terminal article 7 of a series on the slideway 46 to be fed into that pocket by the operation of the feed worm 47.

Figure 5:
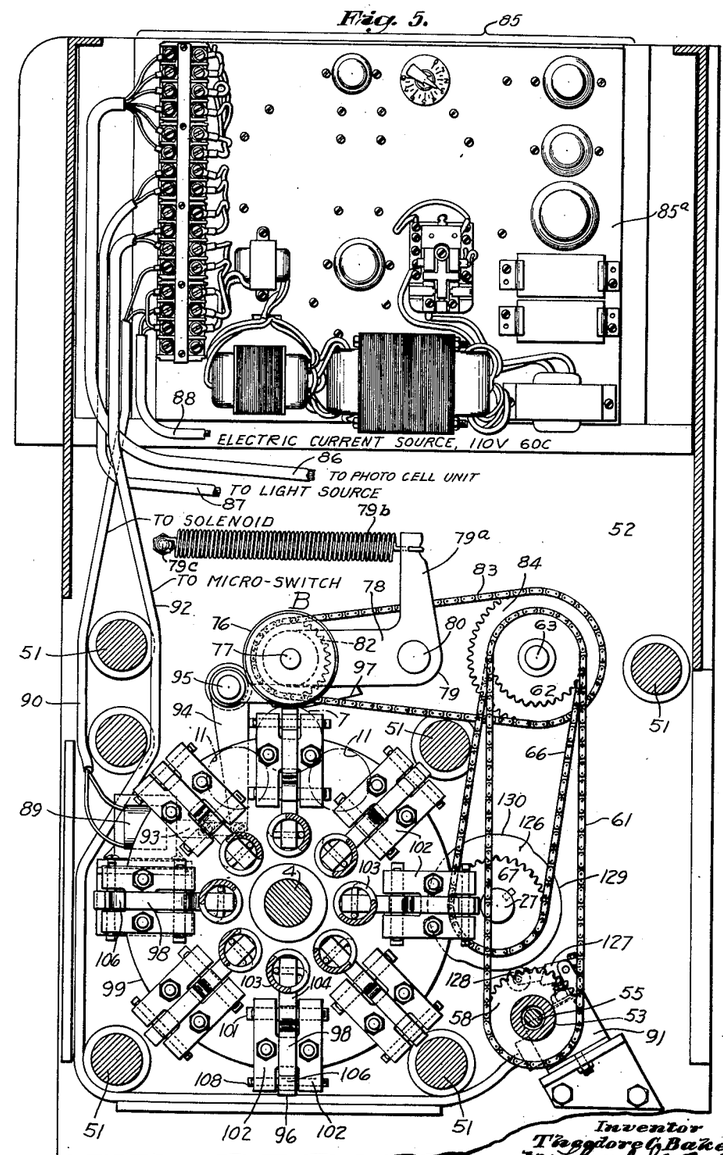
Fig. 5 is a relatively enlarged horizontal section through the upper part of the apparatus, taken approximately along the line 5—5 of Fig. 1, looking in the direction of the arrows.
Figure 6:
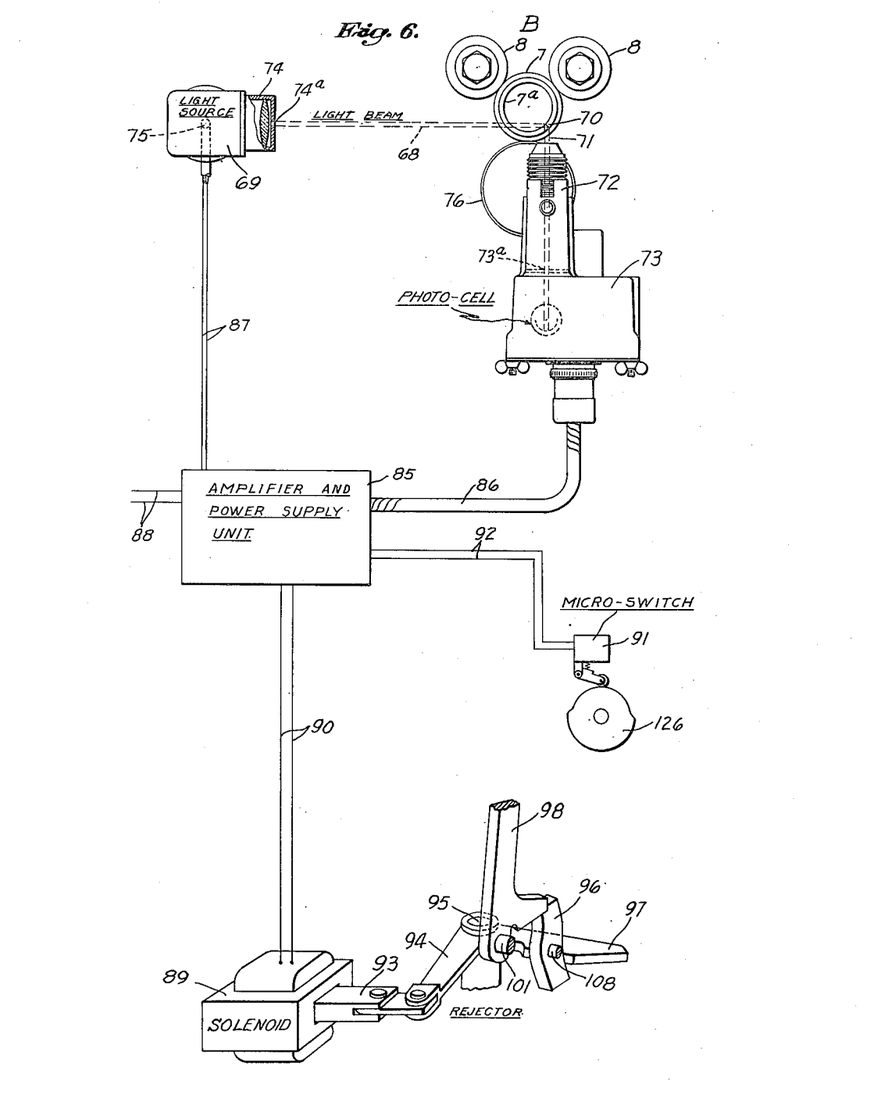
Fig. 6 is a diagrammatic view showing operatively connected electrical and mechanical elements of the article rejection mechanism, certain of these elements being partially broken away.

An indexing or intermittent rotary movement or movements of the carrier will bring the article 7 on the carrier from the loading station A to an inspection station. In the example shown, the inspection station, which is designated B, Figs. 1, 3, 4, 5 and 6, is the second station past the loading station when the carrier is rotated counterclockwise. At the inspection station, a beam of light 68, Fig. 6, is directed from a light source 69 through the near wall of the rim or finished portion 7a of the article 7 to the far wall of this rim or finish portion of the article, the beam of light passing between these walls of the rim or finish portion of the article at one side of a diameter thereof. If the beam of light strikes the wall of a check at the place indicated at 70 in the far wall of the rim or finish portion of the article, it will be reflected, as at 71, so as to enter the receiving end or barrel 72 of a photo-electric cell unit 73. The latter will then function in a known manner to set in operation a connected assembly of electrical and mechanical elements, hereafter to be described, subsequently to eject the article containing the check from the carrier at a rejection station to which that article has been carried by the carrier. Since a check in the rim or finish portion of the article 7 ordinarily will lie in a vertical plane extending approximately radially between the inner and outer surfaces of the portion of the wall in which such check occurs, the light source 69 and the photo-electric cell unit 73 are appropriately located in relation to each other and to the article 7 to detect such a check. In the example shown, the light source 69 is mounted on the top plate 50 of the apparatus at one side of the article 7 at the inspection station. The photo-electric cell unit 73 also is mounted on the top plate 50 in a different direction from the article 7 at the inspection station. The barrel 72 of the photo-electric cell unit and a barrel or light emitting end portion 74 of the light source 69 both are turned toward the rim or finish portion of the article at the inspection station so that lines extending horizontally from the axes of these barrels to the article form an approximate right angle, although this angle may vary within a range from 20° more to 20° less than a right angle. The light source may be a conventional electrical unit having an electric lamp 75 therein and having an exit pupil or aperture 74a, Fig 6, at the axis of the outer end of its barrel portion. Preferably the size of the exit pupil or aperture 74a of the light source is sufficiently small and so located in respect to the rim or finish portion of the article in which a check is to de detected that the component rays of light of the beam passing to the article will not diverge from the horizontal more than 5°. The light receiving inlet pupil or aperture, indicated at 73a, at the axis of the photo-electric cell unit is similarly small. The advantage of this arrangement is that the beam of light from the light source will be reflected by a check in the rim or finish portion of the article into the photo-electric cell unit so as to energize the latter without likelihood of a similar result because of light reflected to the photo-electric cell unit from a seed, plunger groove or mark, or similar blemish in the upper portion of the article. If the beam of light from the light source does not strike a check in the wall of the rim or finish portion of the article 7 at the inspection station, such light will pass on through the article without being reflected into the photo-electric cell unit and the latter will, of course, remain inactive.

The article 7 is rotated about its own vertical axis while it is at the inspection station B. This is accomplished in the apparatus shown by an article rotating roller 76, Figs. 1, 3, 5 and 6. This roller may have a cover of rubber or the like on its peripheral surface, at 76a, Figs. 1 and 3, bearing against the outer surface of the body of the article in equidistantly spaced, cooperative relation to the article positioning rollers 8, as best seen in Fig. 6. The roller 76 is rotatably mounted on the upper end portion of a vertical shaft 77, Fig. 5, which is carried by the outer end portion of an arm 78 of a bell crank lever 79, Figs. 1 and 5, which is pivotally mounted on a vertical shaft 80, as best seen in Fig. 5. The shaft 80 may project upwardly from a socket 81 on a portion of the plate 42, Fig. 1. A sprocket 82 on the lower end portion of the shaft 77, Figs. 1 and 5, is driven by a chain 83 which passes around and engages with the teeth of a sprocket 84 on the hereinbefore mentioned shaft 63. The driving arrangement for the roller 76 preferably is such as to cause two complete rotations of the article 7 about its vertical axis while that article is at the inspection station. This may be varied, however, if, for example, one complete rotation of the article should be deemed sufficient for adequate inspection of the rim or finish portion of the glass article. As indicated by Fig. 5, the bell crank lever 79 may have an arm 79a connected by a coil spring 79b to a fixed attaching element 79c on the plate 52, so that the roller 76 will be continuously maintained by a yieldable means in operative rolling contact with an article 7 at the inspection station or in position for such contact whenever such an article is brought to that station.

The light source may, as aforesaid, be a conventional electric light unit. The photo-electric cell unit similarly may be a conventional unit. The relative positions of these units preferably are such that the beam of light from the light source will strike the wall of the rim or finish portion of the article 7 at an angle of 45° with the normal to the plane of a check in that wall, if there be a check, although this angle may vary within a range from 15° above to 15° less than 45°.

As shown in the diagrammatic Fig. 6, the mechanism controlled by the photo-electric cell unit includes a conventional amplifier and power supply unit, designated 85, to which the photoelectric cell unit is connected electrically, as at 86 and with which the light source also may be connected electrically, as at 87. Power lines which may supply alternating current, 110 v. 60 c., also are connected operatively, as at 88, with the amplifier and power supply unit 85. A solenoid 89 is connected electrically at 90 with this amplifier and power supply unit. A microswitch 91 also may be connected electrically, as at 92, with the same unit for a purpose to be presently explained.

The amplifier and power supply unit should be of a type which will not pick up low audiofrequency or mechanical vibrations, such as may occur in the packing plant or other factory in which the apparatus may be used. This amplifier and power supply unit is shown diagrammatically because its details do not per se form part of the present invention and it may be obtained as a commercial unit, either alone or in combination with an appropriate and also conventional photo-electric cell unit. For example, a commercial mechanism which is produced by the General Electric Company, Schenectady, N. Y., under the designation "G. E. Co. Photo-Cell and Amplifier Unit No. CR7505F124," is suitable for inclusion in the article rejecting mechanism of the illustrative apparatus shown in the drawings. The upper portion of Fig. 5 shows more or less diagrammatically the amplifier and power supply unit 85 and indicates that the main elements thereof may be mounted on a panel 85a on a portion of the plate 52.

Assuming that the photo-electric cell unit has been energized or excited by a reflected beam from a check in the rim or finish portion of the article undergoing inspection, the electrical impulse thereby generated and amplified by the electrical mechanism thus far described, will cause the solenoid 89 to be energized so that its movable core 93 will be actuated to swing a connected bell crank lever 94 in one direction about the axis of a vertical shaft 95 on which such lever is fulcrumed. This will cause a pivoted latch 96 to be engaged by the free or working arm 97 of the lever 94 and to be thereby disengaged from its pivoted article-ejecting or kick-out lever 98. See Figs. 5 and 6. The pivoted article-ejecting or kick-out levers 98 and their associate pivoted latches 96 are mounted on a horizontal plate or table 99 which is pinned at 100, Fig. 2, to the carrier supporting shaft 4 at a predetermined level below the article carrier plate 2. The levers 98 correspond in number and angular spacing around the axis of the shaft 4 with the radial slits 5 in the plate 2 of the aforesaid carrier.

As best seen in Fig. 2, each of the levers 98 is fulcrumed adjacent to its lower end on a horizontal pivot pin 101 which extends between a pair of blocks 102, Figs. 1 and 5, on the table 99. The upper end portion of each lever 98 extends through the corresponding slit 5 in the carrier plate 2 above the latter and between a pair of the rollers 8. A tension spring 103 connects an inwardly extending arm 104 on the lower end portion of each lever 98 with a fastening device 105 on the carrier plate 2. This spring tends to act on the lever 98 so as to swing the upper end portion of that lever outwardly in its slit 5 until an outwardly extending projection 106 on the lower end portion of the lever rests upon a stop or movement limiting block 107 which may be located on the table 99 between the blocks 102. This is the articleejecting position of the lever. Its upper end portion, in moving outward in the slit to that position, will eject from the carrier the article 7 that previously stood on the carrier plate 2 in the path of such outward movement of the lever.

The lever 98 normally is held inactive against its spring 103 by its individual pivoted latch 96. As best seen in Fig. 2, this pivoted latch is mounted on a horizontal pivot pin 108 that extends between outer portions of the aforesaid blocks 102 so that a notched or recessed upper end portion 96a of the latch engages under the outer end portion of an outwardly extending projection or arm 106 on the lever 98, as shown for the right hand lever 98 in Fig. 2. A compression coil spring 109, in a pocket 110 in the peripheral portion of the table 99, bears continuously against the depending tailpiece of the pivoted latch 96 and tends to keep that latch engaged with the lever 98.

When, as previously stated, the solenoid has been energized to cause an operating movement of the solenoid operated lever 94, the free arm 97 of the latter will press inwardly against the depending tailpiece of the latch 96 at the inspection station B so as to disengage the latch from its lever 98. So far as control of the lever 98 by the latch is concerned, the lever then is free to swing outwardly against the article 7 at the inspection station. However, it is preferred that the ejection of the article from the carrier shall take place at a rejection station which is located beyond the inspection station. To this end, the plate 50 on the standards 51 is provided with a closed or endless cam surface 111, Figs. 2 and 4, which extends around the levers 98 at a level below the carrier. This cam surface prevents premature outward article-ejecting movement of an unlatched lever, permits such movement at the proper time, and, also at the proper time in the cycle of rotation of the carrier, biases a previously unlatched lever inwardly to position to permit its individual latch to again engage with it so as to latch it in its inactive position. Thus, the cam surface 111 is circular and concentric for the greater part of its extent with the carrier, as for the portion thereof extending counterclockwise from 112 to 113 in Fig. 4. Thereafter, the cam surface 111 is enlarged at the portion 114. While the levers 98 are traversing the circular portion of the cam surface, i. e., the portion thereof that is concentric with the carrier, each such lever, although unlatched, cannot swing outwardly sufficiently to eject an article from the carrier. However, when the indexing or intermittent rotary movements of the carrier have brought the article in which a check was detected to a subsequent rejection station, which is designated C in Figs. 1, 2, 3 and 4, the lever for that particular article will be permitted by the enlarged portion 114 of the cam surface to swing outwardly under the impulse of its spring 103 and thereby to kick or eject the defective article from the carrier. The rejected article may fall into a chute or trough 115, Fig. 2. Beyond the enlarged portion 114 of the cam surface, that surface may turn inwardly so as to have a radius at 116 less than that of the circular portion 112—113. This low portion of the cam surface will bias the upper end portion of the lever inwardly sufficiently to permit its individual latch 96 to engage therewith, as previously has been explained. Thereafter, that lever will remain in its latched, inactive position until such time as unlatching thereof at the inspection station shall have been effected in the manner described and for the reason given.

Further indexing or intermittent rotary movements of the carrier in a counterclockwise direction will move each pocket on the carrier in its turn past the rejection station to each of the subsequent stations or places of dwell between the rejection station and the loading station. One of these stations, which in the example shown is the second station past the rejection station and is designated D, Figs. 1, 3 and 4, may be utilized as the unloading or delivery station for the inspected articles in which no check was detected.

At the delivery station, a wiper arm 117, constituting an arm of a bell crank lever 118, Fig. 3, mounted on a stationary vertical shaft 119, is swung outwardly against the article at the delivery station D to push it from the carrier into a delivery chute or trough 120 for conducting such article away from the carrier. The vertical shaft 119, upon which the bell crank lever 118 is pivoted, may be carried by any suitable portion of the stationary frame structure of the apparatus, as by the top plate 50, adjacent to the inner end of the loading mechanism. As shown, the bell crank lever 118 has a second arm 121, operatively connected by a link 122 to an eccentric 123 on an enlarged upper end portion 124 of the shaft 55 of the drive for the loading mechanism. By this arrangement, the article displacing arm 117 of the bell crank lever is oscillated back and forth about the axis of its pivotal support in suitably timed relation with the article feeding operations of the loading mechanism and with the intermittent, indexing movements of the carrier, so that an outward, working stroke of the arm 117 of such bell crank lever will occur each time a pocket on the carrier is brought to the unloading or delivery station D.

Thus, all articles moved by the carrier to the delivery station will be unloaded successively and each in its turn so that a continuous line or series of good articles may be supplied to any suitable associate machine (not shown). Obviously, any suitable known article transferring mechanism or unloading device may be used in lieu of that shown in the drawings and herein particularly described.

A guard rail 125, Figs. 1, 2 and 3, may extend part of the distance around the carrier at any place where such a guard rail is needed or is deemed to be desirable to prevent accidental, outward displacement of any article from the carrier by centrifugal force. Such a guard rail may be broken away at the rejection station, if desired, or it may be located at a sufficient height above the level of the carrier table 2 to permit the defective article to be ejected underneath the guard rail by the action of the kick-out lever 98, in which event, the article being ejected will be tilted rearwardly at its upper end, instead of outwardly as shown in the left hand upper portion of Fig. 2.

The rejection mechanism preferably is rendered inactive during the indexing movements of the carrier so as to obviate untimely operation thereof because of random light rays entering the photo-electric cell unit. In the apparatus shown in the drawings, this is accomplished by including the previously mentioned micro-switch 91 in the operating circuit of the rejection mechanism and providing that micro-switch with a suitably timed control device, specifically a cam 126 on the continuously rotating shaft 27, as best seen in Figs. 1 and 5. The micro-switch 91 is opened and closed by a pivoted arm 127 provided with a roller 128 bearing against the periphery of the cam. The cam is laid out so that its peripheral surface comprises a low portion 129 and a high portion 130. When the micro-switch roller is on the low portion 129, the micro-switch will be open so that the rejection mechanism could not function even though light sufficient to excite the photo-electric cell has entered the latter. This is the condition that exists during the indexing movements of the carrier. However, when the roller of the micro-switch is on the high portion 130 of the cam 126, the micro-switch will be closed so that the rejection mechanism then may function when the photo-electric cell unit has been energized in the manner described.

In the operation of the illustrative apparatus shown, each article 7 at the inspection station is rotated twice about its individual axis. The high portion of the cam 126 therefore may be only of sufficient extent to permit operation of the rejection mechanism to unlatch the appropriate kick-out lever during a period of dwell of the carrier. Obviously, it may be desirable to extend the high portion of the cam sufficiently to permit operation of this rejection mechanism just after the beginning of each intermittent rotary movement of the carrier so as to give effect to a condition that was detected by the inspection mechanism during the immediately preceding period of dwell of the carrier. Thus, if the article were rotated only once around its individual axis at the inspection station, a sufficient time, say one-twentieth of a second or more, might be provided after the conclusion of an inspecting period before the micro-switch roller 128 passed onto a low portion of the cam and during which the rejection mechanism could operate.

From the foregoing description of the illustrative apparatus shown in the drawings, it will be apparent that the invention provides an efficient and reliable means for handling a continuous series or line of articles, such as glass jars, for detecting any check in the rim or finish portion of any one of such jars, and for thereafter separating from the good jars those in which checks were detected. The component operations of the apparatus are coordinated and synchronized for effective handling of the articles, detection of checks in the rim or finish portions thereof, sorting out of the defective articles and delivery of the remaining inspected articles to a suitable delivery or article conveying means.

Many changes in and modifications of the illustrative apparatus shown in the drawings and hereinbefore particularly described will now be obvious to those skilled in the art and I therefore do not wish to be limited to the details of such apparatus.

I claim:

1. In apparatus of the character described, a carrier comprising a horizontal supporting plate mounted to rotate about a vertical axis and a second horiontal plate spaced vertically above said first plate and mounted to rotate with the latter about the same vertical axis, means to define a series of angularly spaced open outer-sided pockets on said carrier, between said plates, each pocket being adapted to receive a hollow glass article, such as a jar, the bottom of said pocket including a portion of said first named plate, said means defining said pockets on said carrier including idle rollers at the rear of each such pocket at opposite sides thereof, means for intermittently rotating said carrier about said vertical axis to present each of said pockets in turn at an article loading station, an article inspection station, an article rejection station, and an article unloading station, means for loading articles to be inspected into said pockets successively when each such pocket is at said loading station, an article rotating roller mounted at said inspection station in position to bear against the article in the pocket there and to press such article against the idle rollers at the rear of the pocket, means for rotating said article rotating roller to impart rotation to the article in said pocket, automatic inspection means for detecting defects in the articles in said pockets at said inspection station, normally inactive means controlled by said automatic inspection means to eject from any of said pockets at the rejection station the article therein when said automatic inspection means has detected a defect in that article, and means for removing articles from the pockets on said carrier in turn as each said pocket arrives at said unloading station.

2. In apparatus of the character described, a carrier comprising a horizontal supporting plate mounted to rotate about a vertical axis and a second horizontal plate spaced vertically above said first plate and mounted to rotate with the latter about the same vertical axis, means to define a series of angularly spaced open outer-sided pockets on said carrier, between said plates, each pocket being adapted to receive a hollow glass article, such as a jar, the bottom of said pocket including a portion of said first named plate, means for intermittently rotating said carrier about said vertical axis to present each of said pockets in turn at an article loading station, an article inspection station, and article rejection station, and an article unloading station, means for loading articles to be inspected into said pockets successively when each such pocket is at said loading station, automatic inspection means for detecting defects in the articles in said pockets at said inspection station, said automatic inspection means comprising a light source for a beam of light directed obliquely against the rim or finish portion of the article in a pocket at the inspection station so as obliquely to strike a face of a check in the wall of such rim or finish portion in the path of said beam, a normally inactive photo-electric cell unit located in a position out of line with and so related to the beam as to catch said beam of light as reflected from such a check in the portion of said article struck by the beam from the light source and to be by-passed by the beam so as to remain inactive if no such check exists in such wall, normally inactive means controlled by said automatic inspection means to eject from any of said pockets at the rejection station the article therein when said automatic inspection means has detected a defect in that article, an assembly of electrical and mechanical elements operatively connecting the photo-electric cell unit to said normally inactive article-ejecting means, and means for removing articles from the pockets on said carrier in turn as each said pocket arrives at said unloading station.

3. In an inspection apparatus for detecting checks in the rim portions of hollow glass articles, such as jars, a carrier for presenting such an article in an upright position at an inspection station, means for rotating the article about its vertical axis while it is being inspected at said station, means for directing a beam of light against one side of the wall of the rim portion of the rotating article at an acute angle to a radial plane thereof, and a normally inactive photo-electric cell unit located adjacent to said inspection station with its line of vision at approximately right angles to the beam of light and intersecting said beam at the rim of the article, whereby said photo-electric cell unit will be activated when said beam strikes the face of a check in said wall of the rotating article and is reflected thereby into said photo-electric cell unit.

4. In an apparatus for detecting checks in the rim portion of a hollow glass article, such as a jar, a carrier for supporting and moving a plurality of such articles successively to an inspection station, a rejection station, and a final delivery station, means for rotating each such article about its vertical axis while it is being inspected at said inspecton station, means for directing a beam of light against one side of the wall of the rim portion of the rotating article at an acute angle to a radial plane thereof, a normally inactive photo-electric cell unit located adjacent to said inspection station with its line of vision at approximately right angles to the beam of light and intersecting said beam at the rim of the article, whereby said photo-electric cell unit will be energized when said beam strikes the face of a check in said wall of the rotating article at the inspection station and is reflected thereby into said photo-electric cell unit, normally inactive means operable to eject said article at said rejection station, and means rendered effective by energization of said photo-electric cell unit to operate the means for ejecting said article.

5. In apparatus for detecting checks in the rim portions of hollow glass articles, such as jars, a rotary carrier, means providing a plurality of angularly spaced pockets on said carrier, each adapted to receive one such article and each being open at the periphery of the carrier, means for intermittently rotating said carrier to present each of said pockets in turn at an article loading station, an article inspection station, an article rejection station, and an article unloading or final delivery station, means for loading successive said pockets at said loading station with articles of the character described, means for rotating the article in each pocket at the inspection station while said article is being inspected, means for directing a beam of light against one side of the wall of the rim portion of the rotating article at the inspection station at an acute angle to a radial plane thereof, a normally inactive photo-electric cell unit located adjacent to said inspection station with its line of vision at approximately right angles to the beam of light and intersecting said beam at the rim of the article, whereby said photo-electric cell unit will be energized when said beam strikes the face of a check in said wall of the rotating article and is reflected thereby into said photo-electric cell unit, normally inactive means rendered active by said photo-electric cell unit when the latter has been thus energized to eject said article from its pocket when said pocket is at said article inspection station, and means for removing from its pocket each article arriving at said unloading or final delivery station.

6. In an apparatus for detecting checks in the rim portion of a hollow glass article, such as a jar, a carrier for supporting and moving a plurality of such articles successively to an inspection station, a rejection station, and a final delivery station, means for rotating each such article about its vertical axis when it is at said inspection station, means for directing a beam of light against one side of the wall of the rim portion of the rotating article at an acute angle to a radial plane thereof, a normally inactive photo-electric cell unit located adjacent to said inspection station with its line of vision at approximately right angles to the beam of light and intersecting said beam at the rim of the article, whereby said photo-electric cell unit will be energized when said beam strikes the face of a check in said wall of the rotating article and is reflected thereby into said photo-electric cell unit, normally inactive means operable to eject the article from said carrier at said rejection station, means rendered effective by energization of said photo-electric cell unit to operate the means for ejecting said article, a micro-switch operatively connected to the means for operating the article-ejecting means to prevent operation of the latter when the micro-switch is open, and a cam controlling opening and closing of the micro-switch during each cycle of movements of the carrier, said cam being formed to prevent untimely operation of said article-ejecting means if said photo-electric cell unit should be energized by light other than said reflected beam of light from an article at the inspection station.

7. In an apparatus of character described, a carrier mounted to rotate about its vertical axis and provided with a plurality of pockets spaced angularly about the axis of rotation of the carrier and each open at its outer side for ingress and egress of a hollow glass article, such as a jar, means for rotating said carrier intermittently about said axis to present each of said pockets in turn at a plurality of different stations, including an article inspection station and a subsequent article rejection station, means for rotating each article in a pocket of said carrier at said inspection station when it is being inspected at said station, means for directing a beam of light against one side of the wall of the rim portion of the rotating article at an acute angle to a radial plane thereof, a normally inactive photo-electric cell unit located adjacent to said inspection station with its line of vision at approximately right angles to the beam of light and intersecting said beam at the rim of the article, whereby said photo-electric cell unit will be energized when said beam strikes the face of a check in said wall of the rotating article and is reflected thereby into said photo-electric cell unit, and normally inactive article-ejecting means operatively connected to said photo-electric cell unit so as to be actuated by said energization of the photo-electric cell unit to eject said article from its pocket when it arrives at the rejection station.

8. The sub-combination defined by claim 3 wherein the light source has an exit pupil or aperture of a small size for directing the component rays of light of said beam to the article at the inspection station along paths which do not diverge more than about 5° from the horizontal and wherein the photo-electric cell unit has a light-receiving pupil or aperture of a similarly small size.

9. The sub-combination defined by claim 3 wherein the beam of light from the light source to said wall of the article and the intersecting line of vision of the photo-electric cell unit to said wall subtend an angle of not more than about 110° and not less than about 70°.

10. The combination as defined by claim 4 and, in addition, means for removing from the carrier each article carried thereby to said final delivery station.

11. In an apparatus of the character described, a carrier mounted to rotate about a vertical axis and provided with a plurality of angularly spaced pockets, each adapted to hold a hollow glass article, such as a jar, and each being open at the periphery of the carrier for ingress and egress of such an article, a plurality of pivoted article-ejecting levers mounted for movement with said carrier about said vertical axis, said levers corresponding in number with said pockets and each being operatively associated with a different pocket, each of said levers having a portion movable radially inward from an inactive position at the inner end of the pocket so as to eject from said pocket the article therein, releasable latching means to retain each of said levers in its inactive position at the inner end of said pocket, other means tending to act on said lever continuously to swing it on its outward article-ejecting stroke, means for directing a beam of light obliquely against a portion of the wall of the rim or finish portion of the article in each of said pockets at a predetermined station in the path of movement of said carrier around its vertical axis, a photo-electric cell unit located in position to be energized by light reflected from a check in the wall of said rim or finish portion of the article at said inspection station, and normally inactive means rendered effective by energization of said photo-electric cell to operate the releasable latching means to permit an article-ejecting stroke of its lever.

THEODORE C. BAKER.

References Cited in the file of this patent

UNITED STATES PATENTS

| Number | Name | Date |
|---|---|---|
| 1,640,567 | Firestone | Aug. 30, 1927 |
| 1,925,814 | Nicolson | Sept. 5, 1933 |
| 1,934,187 | Glasgow et al. | Nov. 7, 1933 |
| 1,979,722 | Zworykin | Nov. 6, 1934 |
| 2,008,567 | Simonton | July 16, 1935 |
| 2,027,595 | Knobel | Jan. 14, 1936 |
| 2,065,713 | Knobel | Dec. 29, 1936 |
| 2,100,227 | Stoate | Nov. 23, 1937 |
| 2,132,447 | Stout | Oct. 11, 1938 |
| 2,219,572 | Everett | Oct. 29, 1940 |
| 2,313,218 | Brace | Mar. 9, 1943 |
| 2,318,856 | Hoffman | May 11, 1943 |
| 2,335,686 | Mercur | Nov. 30, 1943 |
| 2,338,868 | Owens | Jan. 11, 1944 |
| 2,354,628 | Whitesell | July 25, 1944 |
| 2,375,260 | Suydam | May 8, 1945 |
| 2,407,062 | Darrah | Sept. 3, 1946 |
| 2,481,863 | Owens | Sept. 13, 1949 |

FOREIGN PATENTS

| Number | Country | Date |
|---|---|---|
| 19,057 | Australia | of 1934 |
| 381,335 | Great Britain | Oct. 6, 1932 |
| 649,180 | Germany | Aug. 17, 1937 |